(12) United States Patent
Wada et al.

(10) Patent No.: US 6,628,318 B1
(45) Date of Patent: Sep. 30, 2003

(54) METHOD FOR DRIVING AN OPTICAL WRITE DEVICE

(75) Inventors: Kenichi Wada, Takatsuki (JP); Itaru Saito, Nishinomiya (JP); Tsukasa Yagi, Kobe (JP)

(73) Assignee: Minolta Co., Ltd., Osaka (JP)

( * ) Notice: Subject to any disclaimer, the term of this patent is extended or adjusted under 35 U.S.C. 154(b) by 824 days.

(21) Appl. No.: 08/988,453

(22) Filed: Dec. 10, 1997

(30) Foreign Application Priority Data

Dec. 11, 1996 (JP) .............................................. 8-330930

(51) Int. Cl.[7] .................................................. B41J 2/47
(52) U.S. Cl. ........................ 347/240; 347/237; 347/247
(58) Field of Search ................................. 347/240, 237, 347/238, 239, 232, 10, 11, 15, 128, 145, 163, 247, 254

(56) References Cited

U.S. PATENT DOCUMENTS 5,193,011 A * 3/1993 Dir et al. ..................... 347/240
5,245,355 A    9/1993 Morton
5,614,936 A * 3/1997 Takahashi .................... 347/240

FOREIGN PATENT DOCUMENTS

| JP | 60135279 | 7/1985 |
| JP | 62281672 | 12/1987 |
| JP | 63049463 | 3/1988 |
| JP | 63272568 | 11/1988 |

* cited by examiner

*Primary Examiner*—Lamson Nguyen
(74) *Attorney, Agent, or Firm*—McDermott, Will & Emery

(57) ABSTRACT

A method for driving an optical write device, in which a time for formation of a pixel is divided into a plurality of periods, and tone level control based on multi-tone image, data is performed in each of the periods. For example, the time for formation of a pixel is divided by applying a train of pulses with widths weighted in the ratio of 4:2.1, and in each duration of the pulses, a clock signal for 64 tone levels is given.

15 Claims, 12 Drawing Sheets

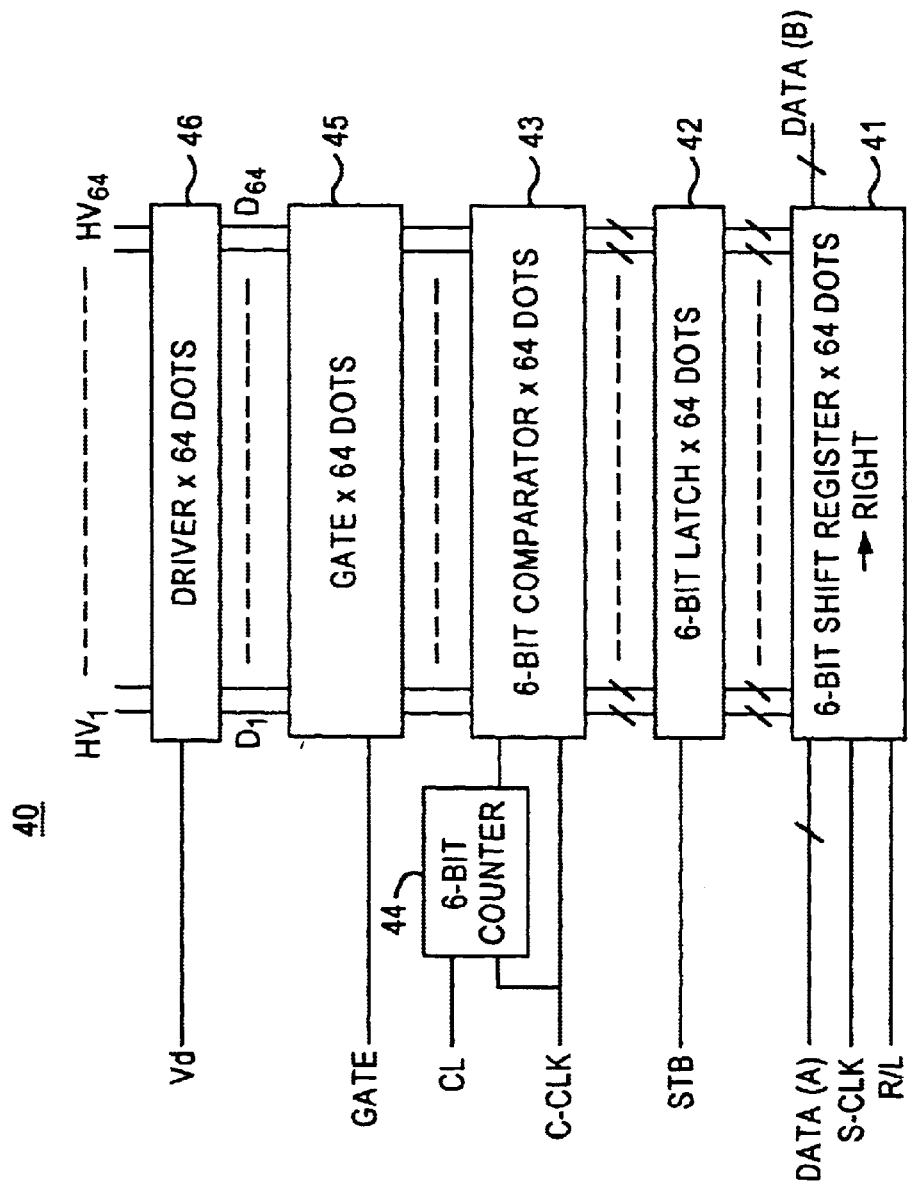

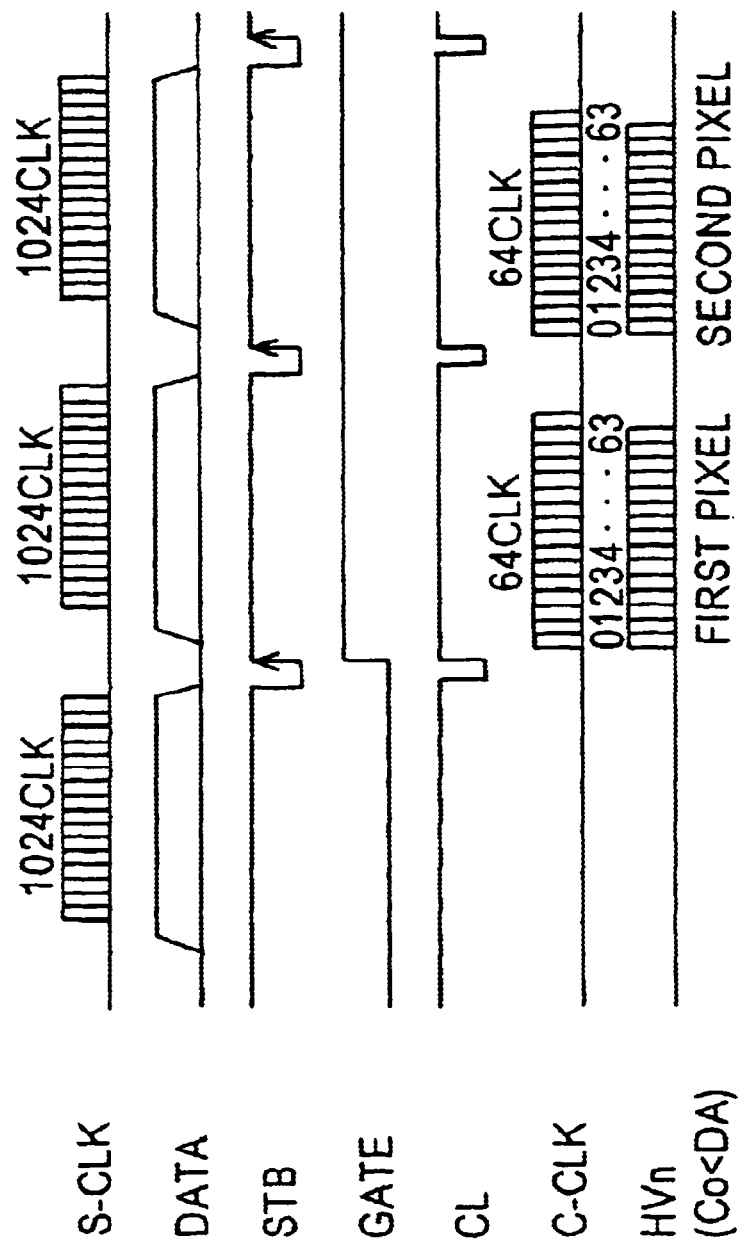

FIG. 8a

|  | 0 | 1 | 2 | 3 | 4 |
|---|---|---|---|---|---|
| 63 | 0 | 249 | --- | --- | 252 |
| ⋮ | 0 | --- | | | |
| | 0 | --- | | | |
| | 0 | --- | | | |
| | 0 | --- | | | |
| 2 | 0 | 5 | --- | | 8 |
| 1 | 0 | 1 | --- | | 4 |
| 0 | 0 | 0 | 0 | 0 | 0 |

HIGHER-ORDER BITS (vertical) / LOWER-ORDER BITS (horizontal)

FIG. 8b

| | 0 ---- | ---- 63 |
|---|---|---|
| 4 | 0  190 ---- | 252 |
| 3 | 0  127 ---- | 189 |
| 2 | 0   64 ---- | 126 |
| 1 | 0    1 ------ | 63 |
| 0 | 0 0 0 0 0 0 0 0 0 0 0 0 0 0 0 | |

HIGHER-ORDER BITS (vertical) / LOWER-ORDER BITS (horizontal)

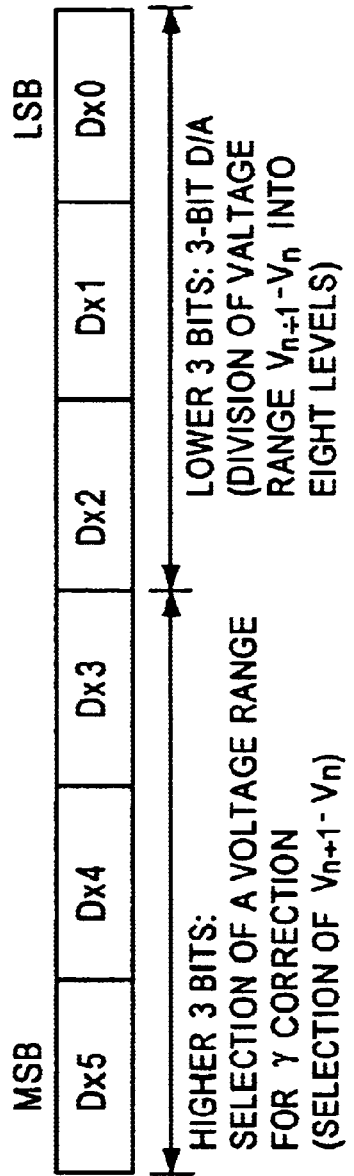
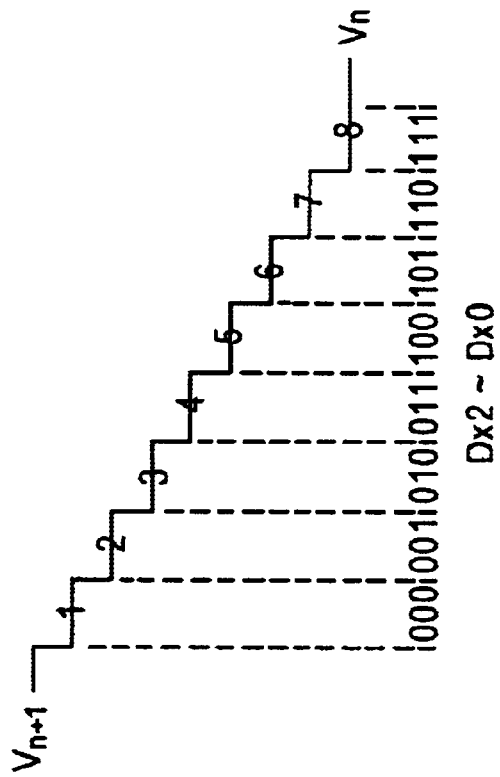
FIG. 11a
FIG. 11b
FIG. 11c

US 6,628,318 B1

METHOD FOR DRIVING AN OPTICAL WRITE DEVICE

BACKGROUND OF THE INVENTION

1. Field of the Invention

The present invention relates to a method for driving an optical write device, and more particularly to a driving method which enables an optical write device to write multi-tone images (latent images) on a photosensitive member.

2. Description of Related Art

Generally, for optical write devices for forming images (latent images) on a silver-salt film or an electrophotographic photosensitive member, it is necessary to drive a light shutter array made of PLZT or the like in multiple tone levels of eight to twelve bits (256 to 4096 levels) for the purpose of reproducing high-quality full color images. Conventionally, it has been practiced that the pulse width or the pulse intensity of a drive signal is modulated in accordance with image data of a plurality of bits. By employing such control, the conventional devices represented tone of a prescribed pixel by one dot. However, only with the modulation control based on image data, driver ICs beyond six bits for exclusive use are necessary for the high-quality multi-tone reproduction, and manufacturing such driver ICs wold result in much higher costs.

SUMMARY OF THE INVENTION

An object of the present invention is to provide a method for driving an optical write device by which the device can employ a structure of low cost.

The other object of the present invention is to provide a method for driving an optical write device which, with low-bit driver ICs for general use, enables the optical write device to reproduce multi-tone images of more bits.

Still further object of the present invention is to provide a method for driving an optical write device which allows the selection of a type of reproduction from different types (e.g., reproduction with smooth density gradation and reproduction with multi-line screen processing) in addition to the above object.

In order to attain the objects above, in a method for driving an optical write device according to the present invention, a time for formation of a pixel is divided into a plurality of periods, and in each of the periods, tone level control based on image data is performed. For example, a case in which six-bit image data for 64 tone levels are given and the time for formation of a pixel is divided into three periods for eight tone levels is described. In this case, the image data are transferred three times for formation of a pixel, and $2^{(3+6)}-(2^6-1)-(2^3-1)=442$ tone levels can be reproduced. In a device adopting the method of this example, if an image to be reproduced is given as eight-bit image data (256 tone levels), the eight-bit (256-level) image data are converted into data for 442 tone levels (for example, referring to a look-up table), and sets of image data for the respective periods are outputted. Because of the reproducibility of 442 tone levels, tone level correction such and γ correction which may be required to make the image match the human's visual sensitivity and the sensitivity of the photosensitive member can be carried out. It also becomes possible to attain smoother representation by performing interpolation among data on the tone levels of pixels.

Therefore, according to the present invention, with six-bit driver ICs for general use, multi-tone images of more bits can be reproduced.

In the present invention, the tone level control based on image data may be either modulation in pulse width or modulation in pulse intensity. The time for formation of a pixel is divided into a plurality of periods either by a train of pulses with widths weighted by 2" or by a train of pulses with uniform widths. If the multi-tone reproduction by the pulses is assigned to lower-order bits, image reproduction with smooth density gradation can be attained, which is suitable for writing on silver-salt films. On the other hand, if the multi-tone reproduction by the pulses is assigned to high-order bits, image reproduction with multi-line screen processing can be attained, which is suitable for writing on electrophotographic photosensitive members. Further, if the pulses are allocated in a discrete manner, image reproduction with smooth density gradation can be attained, and if the pulses are allocated in a concentrated manner, image reproduction with multi-line screen processing can be attained.

BRIEF DESCRIPTION OF THE DRAWINGS

These and other objects and features of the present invention will be apparent from the following description with reference to the accompanying drawings, in which:

FIG. 2 is a block diagram of a driver IC which is used in a first embodiment of the present invention;

FIG. 3 is a timing chart showing the operation of the driver IC;

FIGS. 5a and 5b are charts showing examples of combination of multi-tone reproduction based on image data with multi-tone reproduction by pulses in the case of FIG. 4a;

FIGS. 8a and 8b are charts showing examples of combination of multi-tone reproduction based on image data with multi-tone reproduction by pulses in the case of FIG. 7;

FIGS. 11a, 11b and 11c are charts showing external input voltages according to the second embodiment.

DETAILED DESCRIPTION OF THE PREFERRED EMBODIMENTS

Some exemplary methods of driving an optical write device according to the present invention are described with reference to the accompanying drawings.

Optical Write Head

Figure 1:
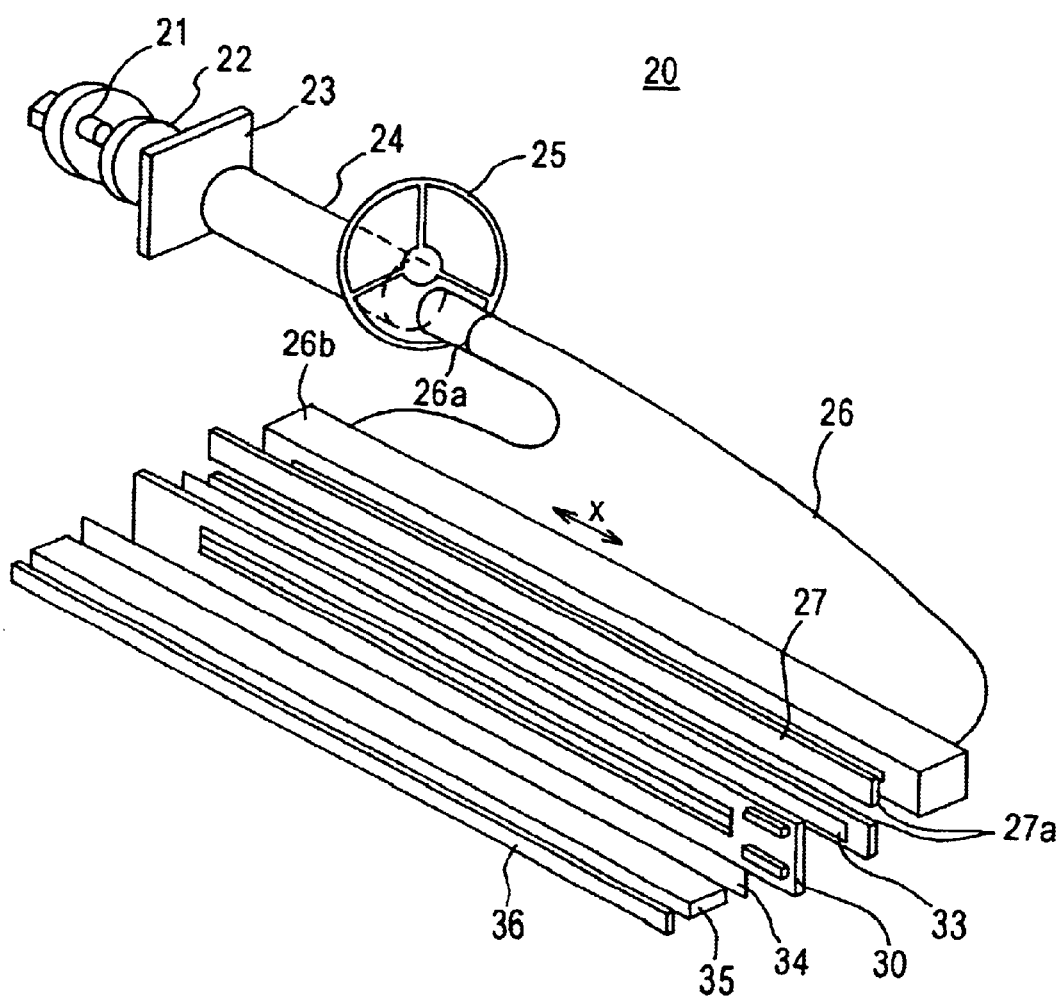
FIG. 1 is a perspective view of an optical write head to which a method according to the present invention is to be applied.

FIG. 1 shows an optical write head 20 to which a method of the present invention is to be applied. This optical write head 20 is to write a full-color image on a silver-salt film. The optical write head 20 mainly comprises a halogen lamp 21, a heat insulating filter 22, a color correction filter 23, a light dispersing cylinder 24, a RGB filter 25, an optical fiber array 26, a slit plate 27, a light shutter module 30, an imaging lens array 35 and a dust protective glass 36.

The heat insulating filter 22 cuts the infrared component of light emitted from the halogen lamp 21, and the color correction filter 23 controls the light in quality so that the light will match the spectral sensitivity characteristic of the print sheet. The light dispersing cylinder 24 is to improve the efficiency of use of light and to suppress the unevenness in quantity of light. The RGB filter 25 is driven to rotate in synchronization with image writing by the light shutter module 30, which will be described later, and transmits different colors line by line.

The optical fiber array 26 is composed of a large number of optical fibers. The optical fibers are bundled at one end 26a, and the end 26a faces the dispersing cylinder 24 with the RGB filter 25 in-between. The optical fibers are aligned to extend in a main scanning direction indicated by arrow X at the other end 26b, so that light is emergent from the optical fiber array 26 linearly. The slit plate 27 has mirror surfaces 27a so as to guide the light emergent from the optical fiber array 26 to the light shutter module 30 efficiently. Further, a heater (not shown) is provided to the slit plate 27. The heater is to maintain the temperature of PLZT shutter tips of the light shutter module 30, and the temperature control is carried out in accordance with a detection result of a thermometer (not shown) provided to the module 30.

The light shutter module 30 has an array of PLZT light shutter tips, each of which has shutter elements, on a slit of a ceramic substrate or on a glass substrate and an array of driver ICs which is parallel to the array of PLZT light shutter tips. The light shutter elements are driven by the driver ICs in such a way that only specified pixels will be printed. Also, a polarizer 33 and an analyzer 34 are provided before and after the module 30, respectively. As is well known, PLZT is a ceramic which has an electrooptic effect at a large Kerr constant and is light-transmitting. The light is linearly polarized by the polarizer 33, and the polarization plane of the light rotates in accordance with turning-on and turning-off of electric fields caused by supplies of voltages to the light shutter elements. Consequently, the light emergent from the analyzer 34 is turned on and off part by part.

The light emergent from the analyzer 34 is imaged on the print sheet via the imaging lens array 35 and the dust protective glass 36, and thus, a latent image is formed on the print sheet. The print sheet is transported in a direction (sub scanning direction) perpendicular to the main scanning direction X at a constant speed.

First Embodiment

The first embodiment is a method of driving the light shutter module 30 to reproduce more than 64 tone levels by using a driver IC (integrated circuit) which is capable of handling 8-bit data at one time. To reproduce more than 64 tone-levels by one pixel, each light shutter element is driven in accordance with a train of pulses. The pulse widths of pulses are weighted by $2^n$ and these pulses are applied during a time for formation of one pixel.

FIG. 2 shows the structure of a driver IC 40 which is used for multi-tone reproduction in this embodiment, and FIG. 3 shows a timing chart of its operation. For practical use, a plurality of driver ICs 40 are connected to each other by a ladder chain to drive one thousand twenty four light shutter elements of light shutter tips. Each driver IC 40 is to drive 64 light shutter elements, and comprises a six-bit shift register 41, a six-bit latch circuit 42, a six-bit comparator 43, a six-bit counter 44, a gate circuit 45 and a driver circuit 46.

Image data DATA(A) and DATA(B) are shifted into the shift register 41 based on a shift signal R/L in synchronization with a shift clock signal S-CLK. During the shifting operation, six-bit image data of each pixel is shifted in parallel. After the shifting operation, sixty four sets of the image data are latched in the latch circuit 42 controlled by a strobe signal STB. Thereby, the tone level of each pixel is set. The counter 44 counts the clock signal C-CLK, and the comparator 43 compares each latched value with the counter value. When the each latched value and counter value become equal, the gate circuit 45 stops the output of each of signals $D_1$ through $D_{64}$. the counter 44 is cleared in response to a clear signal CL.

A driving voltage Vd is applied to the driver circuit 46, and the driving circuit outputs $HV_1$ through $HV_{64}$ to the light shutter elements. The pulse widths of $HV_1$ through $HV_{64}$ are set in accordance with signals $D_1$ through $D_{64}$ sent from the gate circuit 45. Consequently, each light shutter element is turned on for a duration (pulse width) in accordance with the image data DATA for formation of a pixel.

In the optical write head 20 provided with the driver ICs 40, an image with not more than 64 tone levels can be reproduced by controlling the turn-on duration of each light shutter element based on image data. Although reproducibility of 64 tone levels is within a practically permissible range for formation of normal images, it is insufficient to perform subtle light-quantity correction for each pixel or to obtain high-definition multi-tone images. Developing multi-level driver ICs for these purposes would cost much, and a driver IC which enables reproduction of more tone levels would require a large logic, thereby increasing the cost of the IC itself. Moreover, the required number of tone levels vary depending on applications, which gives rise to an issue of difficulty in sharing components.

Figure 4A:
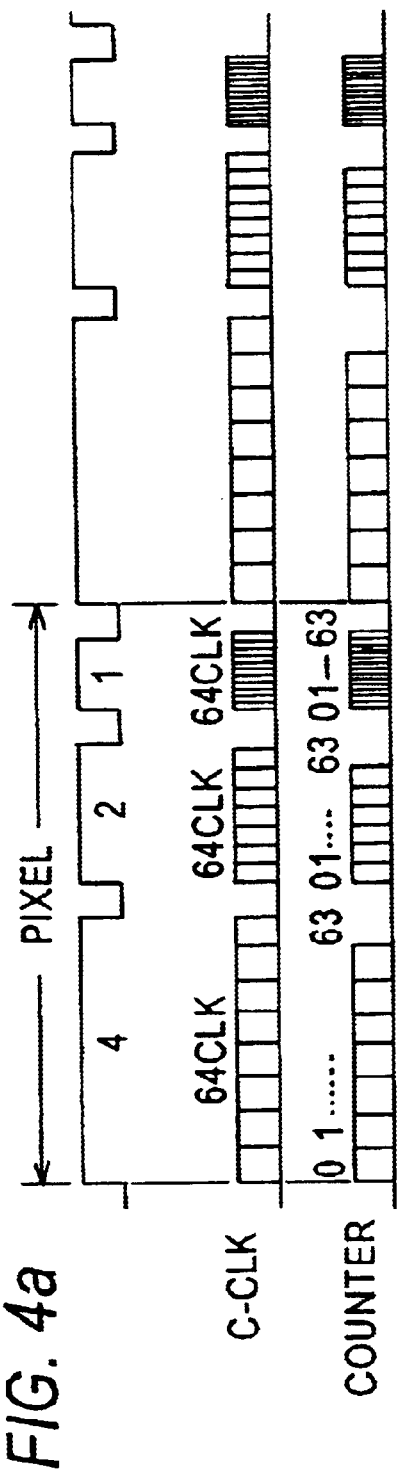
FIGS. 4a and 4b are charts showing pulse waveforms during a time for formation of a pixel, FIG. 4a showing the first embodiment and FIG. 4b showing a prior art.
Figure 4B:
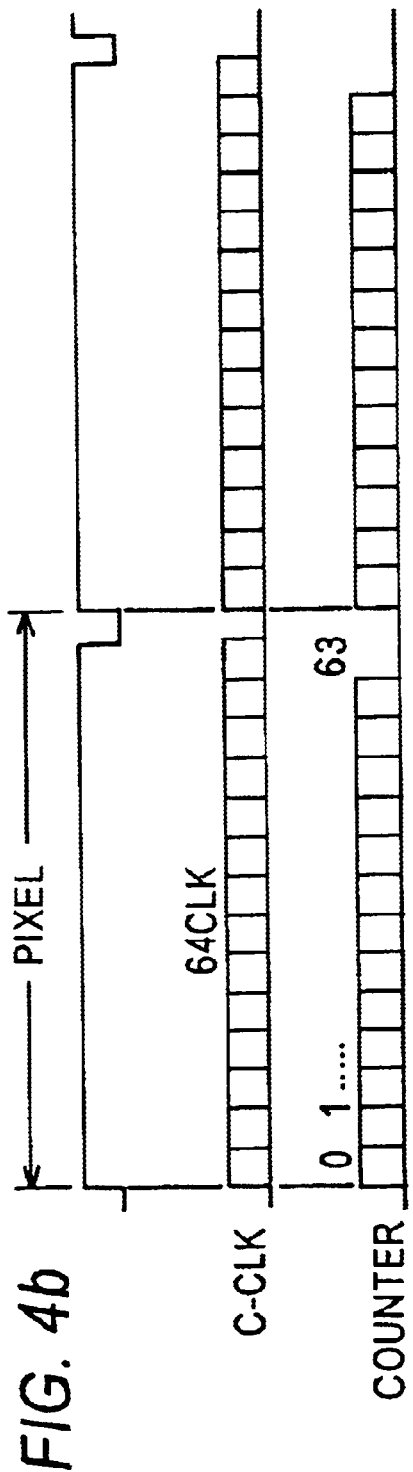

The first embodiment intends to increase the number of reproducible tone levels by applying a plurality of pulses during a time for formation of a pixel. More specifically, as shown in FIG. 4a, a train of three pulses with widths weighted in the ratio of 4:2:1 are applied during the time for formation of a pixel, and a clock signal C-CLK whose frequency is modulated so that 64 pulses will be given in each duration of the three pulses is applied. The driving frequency (the time for formation of a pixel) of the optical write head 20 depends on print a resolution and process speed (transport speed of print sheets). Data transfer is executed three times for a pixel, thereby enabling reproduction of eight levels corresponding to $2^3$. A combination of the eight-level reproduction with the 64-level ($2^6$-level) reproduction by the driver ICs 40 allows a total of $2^{(3+6)}-(2^6-1)-(2^3-1)=442$ levels to be reproduced. FIG. 4b is a timing chart which shows reproduction of 64 levels only with six-bit driver ICs in the prior art, for comparison's sake.

Figure 5A:
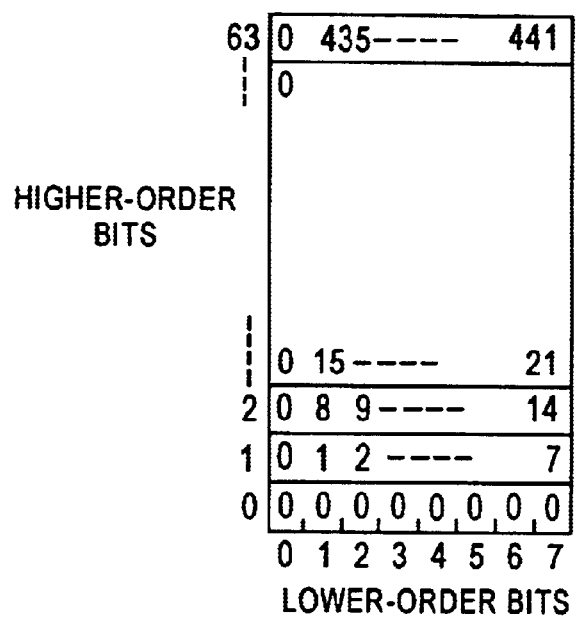
Figure 5B:
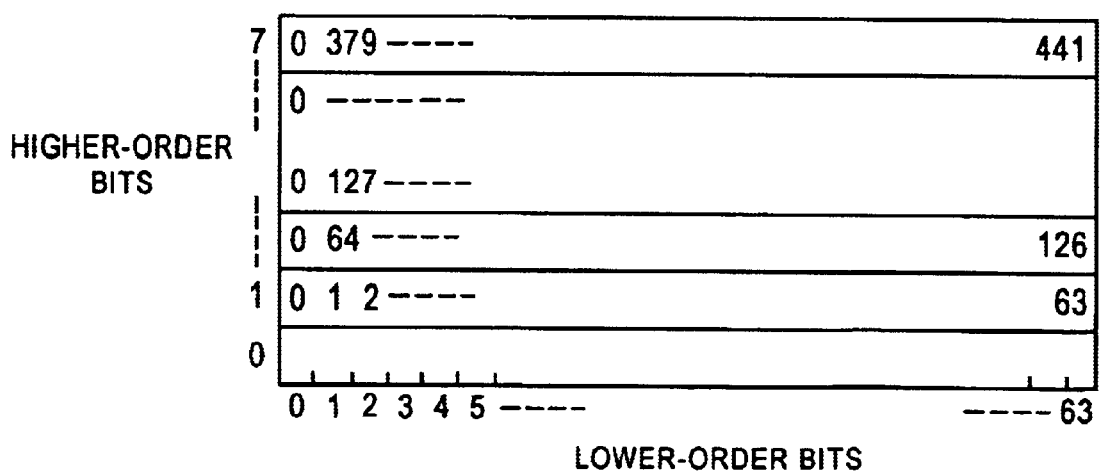

With respect to the combination between the multi-tone reproduction based on image data and the multi-tone reproduction by the train of pulses, if the multi-tone reproduction by the train of pulses is assigned to lower-order bits as shown in FIG. 5a, almost all the light shutter elements will be turned on in almost all the pulse durations. In addition to this, the printing resolution in the sub scanning direction increases substantially threefold, so that a high-quality image with smooth density gradation can be obtained. On the other hand, if the multi-tone reproduction by the train of pulses is assigned to higher-order bits as shown in FIG. 5b, an image with multi-line screen processing can be obtained.

As described above, tone-level data which are fed to the driver ICs 40 for drive of each light shutter element are three sets of six-bit data. These three sets of six-bit data are generated by a tone converter circuit provided in the upper stage of the driver ICs 40. The tone converter circuit receives multi-tone image data from, for example, an external computer, and converts the data into three sets of six-bit data for a drive of each light shutter element. Then, the tone converter circuit feeds the data to the driver ICs 40 at the aforementioned timing. More specifically, the conversion is done according to the table shown by FIG. 5a or 5b, and this conversion may be implemented either by software processing or by hardware circuit processing. That is, 9-bit multi-tone image data inputted from the external computer is converted into three sets of 6-bit data by a converter circuit.

In general, for silver-salt images, the smoothness of halftones is regarded as important, and the appearance of texture in the images is undesirable. On the other hand, in the art of electrophotography, it has been a practice to introduce texture with regularity like multi-line screen processing so as to reduce the influence of the noise of the apparatus and the influence of the development characteristics onto the picture quality. Accordingly, the combination of FIG. 5a is suited for writing onto silver-salt films, while the combination of FIG. 5b is suited for writing onto electrophotographic photosensitive members.

Figure 6A:
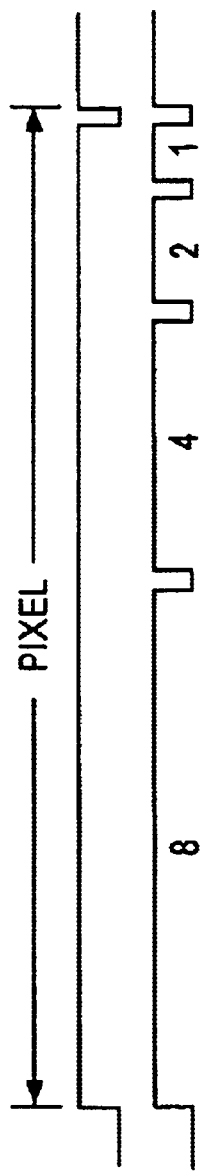
FIGS. 6a through 6e are charts showing various arrangements of pulses.
Figure 6B:
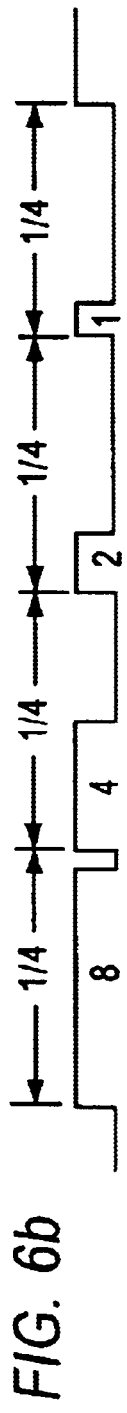

Meanwhile, the allocation of pulses and the data transfer timing may be implemented in various ways. For example, as shown in FIG. 6a, one possible way is to allocate four pulses with widths weighted in the ratio of 8:4:2:1 in the time for formation of a pixel according to the weights themselves of the pulses. This can be adopted in cases where the speed of data transfer is variable during the time for formation of a pixel. In the case of FIG. 6a, the data of weight 8 of a prescribed pixel must be transferred during the pulse duration of weight 1 of previous pixel, thereby interfering with speed-up of printing and causing variations in print intervals. However, this is permissible for most applications. Another possible way is to divide the time for formation of a pixel into four periods uniformly and to allocate four pulses with different widths in the four periods one by one as shown in FIG. 6b. This allows the speed of data transfer to be set equal in any of the four periods, offering an advantage that the control circuit is simple. However, even if the light shutter element is turned on in all the four periods, the duty factor would be not more than approximately 50%, inevitably resulting in low efficiency of use of light.

Figure 6C:
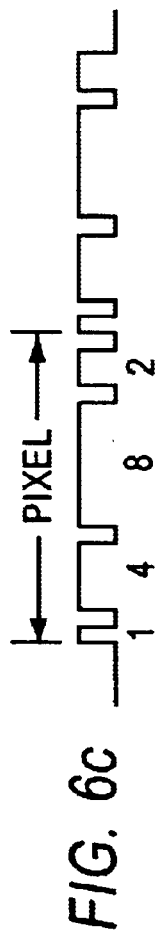
Figure 6D:
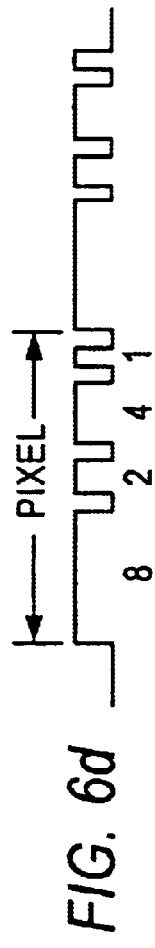
Figure 6E:
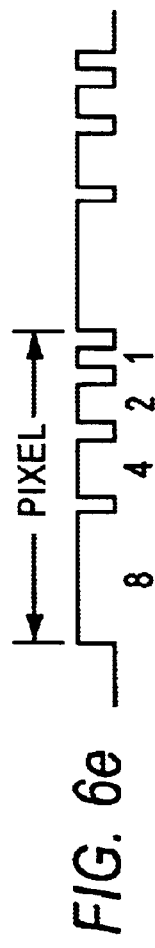

In turn, the arrangement of the pulses with different widths influences the type of reproduction. FIG. 6c shows an arrangement in which pulses of heavier weights are gathered in the center part of the time for a pixel, resulting in image reproduction with multi-line screen processing. FIG. 6d shows an arrangement in which pulses of heavier weights are dispersed, resulting in image reproduction of smooth density gradation. FIG. 6e shows an arrangement of simple decrease in order of weight (conversely, simple increase is also possible). In general, this allows sufficiently high-quality images to be obtained, considering the performance of the image receiving medium responsive to the image resolution in the sub scanning direction attained by the optical write head 20.

Figure 7:
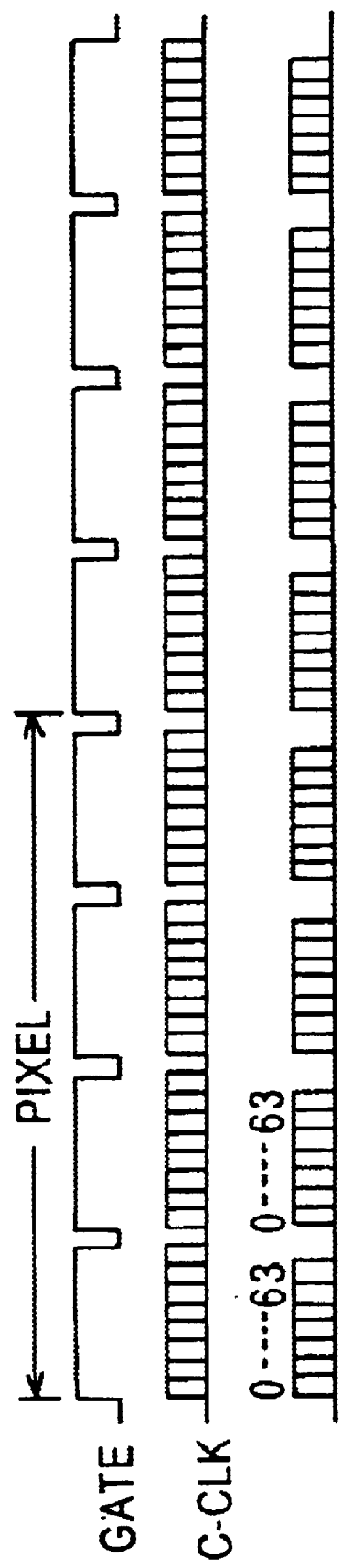
FIG. 7 is a chart showing another pulse waveform during the time for formation of a pixel according to the first embodiment.

In the first embodiment, it is also possible that a plurality of pulses with uniform widths are applied during the time for formation of a pixel so that the number of reproducible tone levels can be increased from 64, which can be attained based on image data, by controlling the number of pulses in which the light shutter element is to be turned on. More specifically, as shown in FIG. 7, the time for formation of a pixel is divided into four periods uniformly, and four pulses with uniform widths are applied in the four periods one by one. In each duration of the pulses, a clock signal C-CLK with 64 pulses is given. Data transfer is executed four times for formation of a pixel, and in combination with the 64-level reproduction based on image data, a total of $\{(64-1)\times 1\}+1=253$ levels can be reproduced.

With respect to the combination between the multi-tone reproduction based on image data and the multi-tone reproduction by the pulses, a method of assigning the multi-tone reproduction by the pulses to lower-order bits as shown in FIG. 8a and a method of assigning the multi-tone reproduction by the pulses to high-order bits as shown in FIG. 8b are possible. As described above, the former method results in obtaining images with smooth density gradation, and the latter method results in obtaining images with multi-line screen processing.

Considering that if weighted four pulses are applied during the time for formation of a pixel, reproduction of $2^{10}-(2^4-1)-(2^6-1)=946$ levels becomes possible, the case of FIG. 7 might be regarded as less advantageous. However, because the frequency of the clock signal C-CLK may be constant, the control can be simplified, which is an effective advantage.

Second Embodiment

Figure 9:
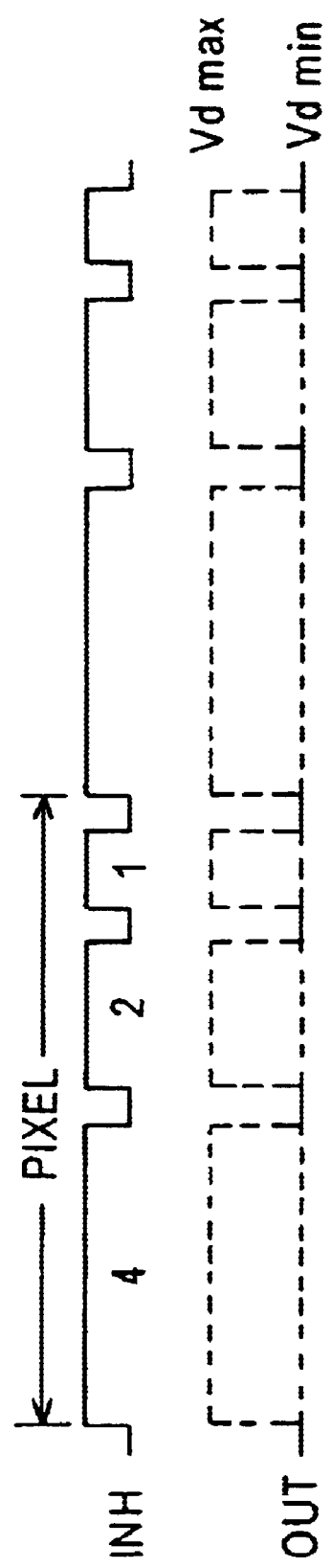
FIG. 9 is a chart showing a train of pulses applied during the time for formation of a pixel and a driving voltage according to a second embodiment of the present invention.

The second embodiment is a method of driving the light shutter module 30 by a combination of six-bit image data for pulse intensity modulation for reproduction of 64 tone levels and a train of pulses which are weighted by $2^n$ and applied during a time for formation of a pixel. As shown in FIG. 9, by combining the 64-level reproduction by the six-bit intensity modulation with eight-level reproduction attained by applying a train of three pulses (three bits) with widths weighted in the ratio of 4:2:1 during the time for formation of a pixel, a total of $(64-1)\times(2^2+2^1+1)+1=442$ levels can be reproduced. The output voltage is controlled for each pulse within a range of $Vd_{min}$ to $Vd_{max}$.

Figure 10:
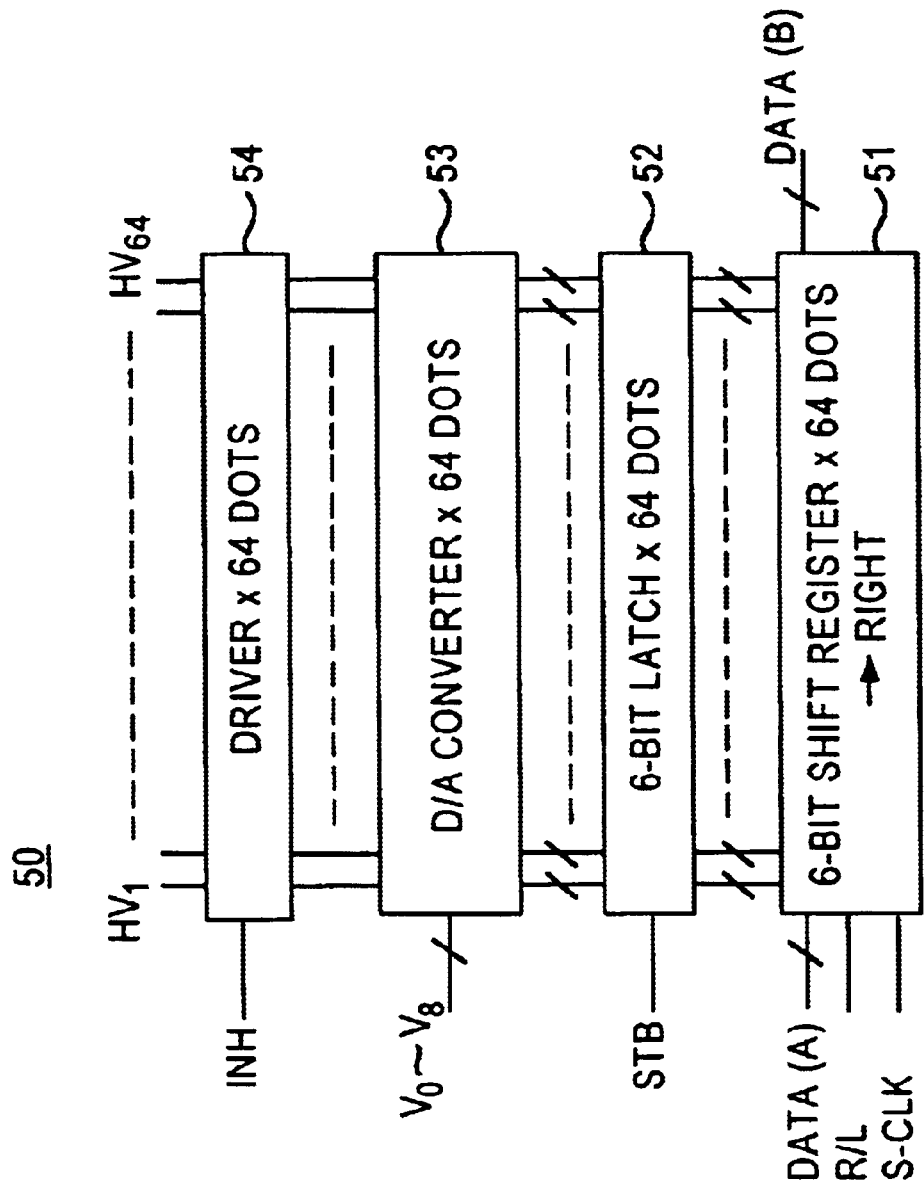
FIG. 10 is a block diagram of a driver IC which is used in the second embodiment.

FIG. 10 shows the structure of a driver IC 50 which is used in the second embodiment. The driver IC 50 comprises a six-bit shift register 51, a six-bit latch circuit 52, a D/A converter 53 and a driver circuit 54. Image data DATA(A) and DATA(B) are shifted into the shift register 51 in parallel based on a shift signal R/L in synchronization with a shift clock signal S-CLK and are latched in the latch circuit 52 controlled by a strobe signal STB. An analog signal in accordance with the tone level of the image data DATA is outputted from the D/A converter 53. The driver circuit 54 applies a voltage to light shutter elements while an inhibit signal INH holds on.

Figure 12:
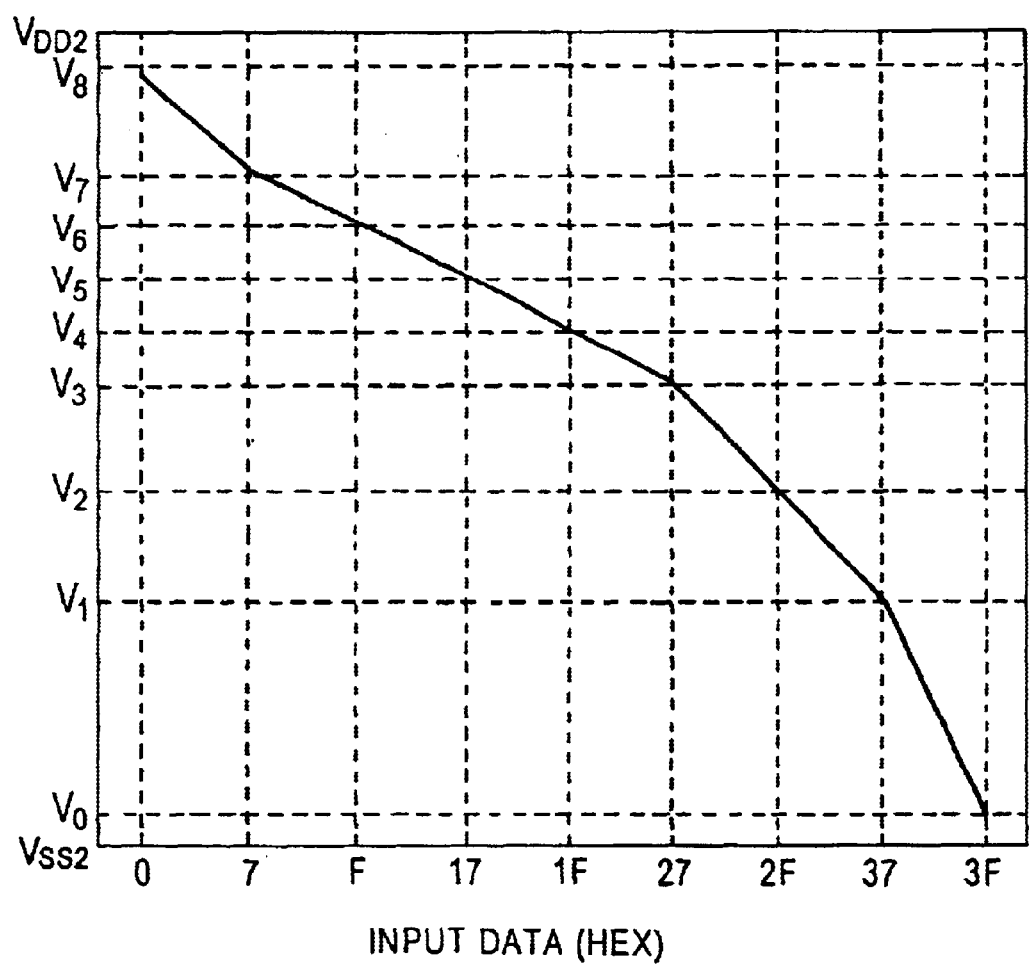
FIG. 12 is a graph showing the correlation between input data and the external input voltages.

External input voltages $V_0$ through $V_8$ are applied to correct the γ characteristic of the output of the driver circuit 54. The voltage $V_0$ through $V_8$ correspond to main arbitrary nine points on the γ characteristic curve. As shown in FIG. 11a and 11b, a voltage range from $V_{n+1}$ to $V_n$ is selected based on the higher three-bit data. As shown in FIGS. 11a and 11c, the voltage range from $V_{n+1}$ to $V_n$ are further divided into eight levels uniformly, and one of the eight levels is selected based on the lower three-bit data which have been subjected to D/A conversion. Thus, voltages for 64 tone levels can be outputted. FIG. 12 shows the correlation between the input data and the external input voltage $V_0$ through $V_8$.

Further, also in the second embodiment, the multi-tone reproduction by the pulses may be assigned to lower-order bits or to higher-order bits in combining it with the multi-tone reproduction based on image data. Also, the weighted pulses may be allocated either in a discrete manner or in a concentrated manner. Furthermore, as shown in FIG. 7, it is possible to divide the time for formation of a pixel into periods uniformly by a plurality of pulses with uniform widths. In this case, the number of reproducible tone levels can be increased from 64, which can be attained based on image data, by controlling the number of pulses in which the light shutter element is turned on.

Other Embodiments

As well as the PLZT light shutter array, it is possible to use an array of LEDs (light emitting diodes), an array of LCSs (liquid crystal shutters), a DMD (deformable mirror device) and a FLD (fluorescent device) and the like. Further, methods according to the present invention are applicable to raster type optical write devices which scan a laser beam with a polygon mirror, a galvano mirror or the like as well as to solid type optical write devices.

Although the present invention has been described in connection with the preferred embodiments above, it is to be noted that various changes and modifications are possible to those who are skilled in the art. Such changes and modifications are to be understood as being within the scope of the present invention.

What is claimed is:

1. A method for driving an write device which writes an image based on image data, the method comprising the steps of:

dividing a time for formation of a pixel into a plurality of periods and performing multi-tone level control based on the image data in each of the periods, said multi-tone level including at least three levels.

2. The method for driving an write device according to claim 1, wherein the tone level control based on the image data is performed by modulation in pulse width.

3. The method for driving an write device according to claim 1, wherein the tone level control based on the image data is performed by modulation in pulse intensity.

4. The method for driving an write device according to claim 1, wherein the time for formation of a pixel is divided into periods of a train of pulses with widths weighted by $2^n$.

5. The method for driving an write device according to claim 4, wherein multi-tone reproduction of multi-bit image data by the train of pulses is assigned to lower-order bits of said multi-bit image data.

6. The method for driving an write device according to claim 4, wherein multi-tone reproduction of multi-bit image data by the train of pulses is assigned to high-order bits of said multi-bit image data.

7. The method for driving an write device according to claim 4, wherein the pulses of heavier weights are dispersed.

8. The method for driving an write device according to claim 4, wherein the pulses of heavier weights are gathered.

9. The method for driving an write device according to claim 1, wherein the time for formation of a pixel is divided into periods of a train of pulses with uniform widths.

10. The method for driving an write device according to claim 9, wherein multi-tone reproduction of multi-bit image data by the train of pulses is assigned to lower-order bits of said multi-bit image data.

11. The method for driving an write device according to claim 9, wherein multi-tone reproduction of multi-bit image data by the train of pulses is assigned to high-order bits of said multi-bit image data.

12. The method for driving an write device, the method comprising the steps of:

a first step of converting an n-bit image data for one pixel into as plurality of sets of m-bit data, wherein m is larger than 1 but smaller than n;

a second set of modulating a write element based on a first set of data of the plurality of sets; and a third step of modulating the write element based on a second set of data of the plurality of sets.

13. An image write apparatus comprising:

a write head; and a driver for driving the write head to divide a time for formation of a pixel into a plurality of periods and perform multi-tone level control based on image data in each of the periods, said multi-tone level including at least three levels.

14. The image write apparatus according to claim 13, wherein the multi-tone level control by the driver based on image data is performed by modulation in pulse width.

15. The image write apparatus according to claim 14, wherein the multi-tone level control by the driver based on image data is performed by modulation in pulse intensity.

* * * * *

UNITED STATES PATENT AND TRADEMARK OFFICE
CERTIFICATE OF CORRECTION

PATENT NO. : 6,628,318 B1
DATED : September 30, 2003
INVENTOR(S) : Kenichi Wada et al.

It is certified that error appears in the above-identified patent and that said Letters Patent is hereby corrected as shown below:

Column 7,
Lines 28, 35, 38, 41 and 44, change "A method for driving an write device" to
-- A method for driving a write device --

Column 8,
Lines 3, 7, 9, 11, 14, 18 and 22, change "A method for driving an write device" to
-- A method for driving a write device --

Signed and Sealed this

Seventeenth Day of August, 2004

JON W. DUDAS
*Acting Director of the United States Patent and Trademark Office*